US 6,619,744 B2

(12) United States Patent
Reubeuze

(10) Patent No.: US 6,619,744 B2
(45) Date of Patent: Sep. 16, 2003

(54) VEHICLE SEAT FITTED WITH A HINGE MECHANISM

(75) Inventor: Yann Reubeuze, Landigou (FR)

(73) Assignee: Faurecia Sieges d'automobile S.A., Boulogne (FR)

( * ) Notice: Subject to any disclaimer, the term of this patent is extended or adjusted under 35 U.S.C. 154(b) by 0 days.

(21) Appl. No.: 10/034,766

(22) Filed: Dec. 27, 2001

(65) Prior Publication Data
US 2002/0096924 A1 Jul. 25, 2002

(30) Foreign Application Priority Data
Dec. 29, 2000 (FR) .............................. 00 17289

(51) Int. Cl.$^7$ .............................. B60N 2/02; B60N 2/20
(52) U.S. Cl. .................................. 297/378.12; 297/367
(58) Field of Search ............................. 297/367, 378.12

(56) References Cited

U.S. PATENT DOCUMENTS

| 4,660,886 A | 4/1987 | Terada et al. ............... 297/367 |
| 5,611,599 A | 3/1997 | Baloche et al. ............. 297/367 |
| 5,820,218 A | 10/1998 | Baloche et al. ............. 297/367 |
| 6,164,723 A | 12/2000 | Ganot ...................... 297/378.12 |
| 6,402,249 B1 * | 6/2002 | Rohee et al. ............... 297/367 |

FOREIGN PATENT DOCUMENTS

| DE | 35 21 730 | 12/1985 |
| DE | 199 15 863 | 10/1999 |
| EP | 0 694 434 | 1/1996 |
| EP | 0 705 727 | 4/1996 |
| FR | 2 494 574 | 5/1982 |

OTHER PUBLICATIONS

French Preliminary Search Report dated Sep. 4, 2001, Appl. No. FR 0017289.

* cited by examiner

Primary Examiner—Anthony D. Barfield
(74) Attorney, Agent, or Firm—McCracken & Frank

(57) ABSTRACT

A seat has a back connected to a seat proper via a hinge comprising two cheekplates that can be secured to each other by means of toothed slugs controlled by a cam. In order to enable the seat back to be folded down forwards, and then to return the back into its initial position, the cam of the hinge is associated with an external memory mechanism implemented in the form of a self-contained assembly which includes its own drive member connected to the cam by a mechanical connection including lost motion that is adapted so that actuation of the cam does not move the drive member, and so that actuation of the drive member causes the cam to be moved towards its unlocked position.

11 Claims, 8 Drawing Sheets

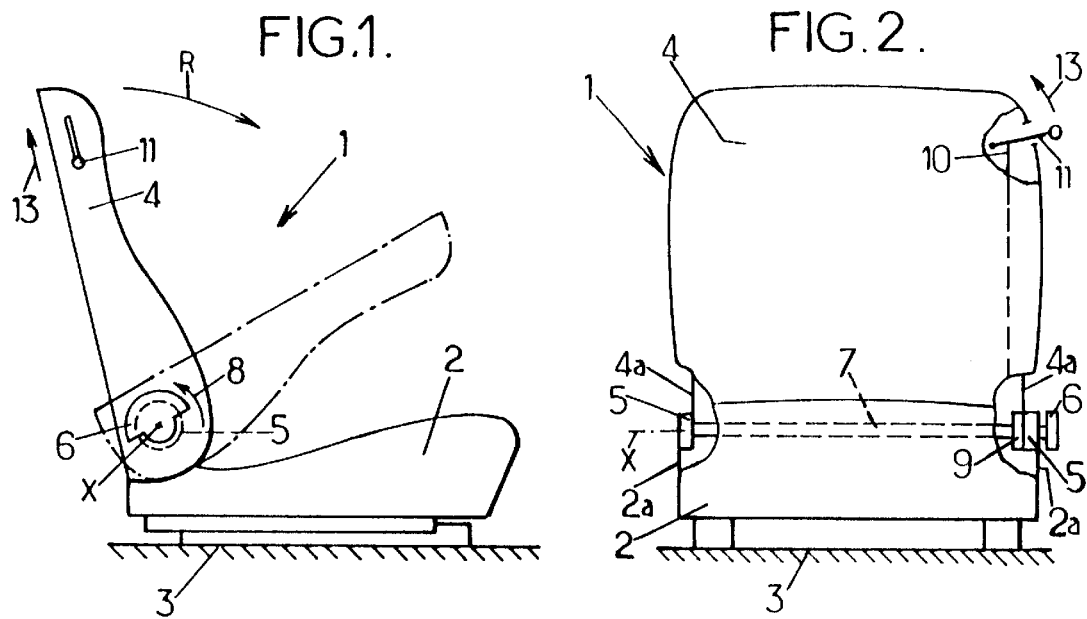
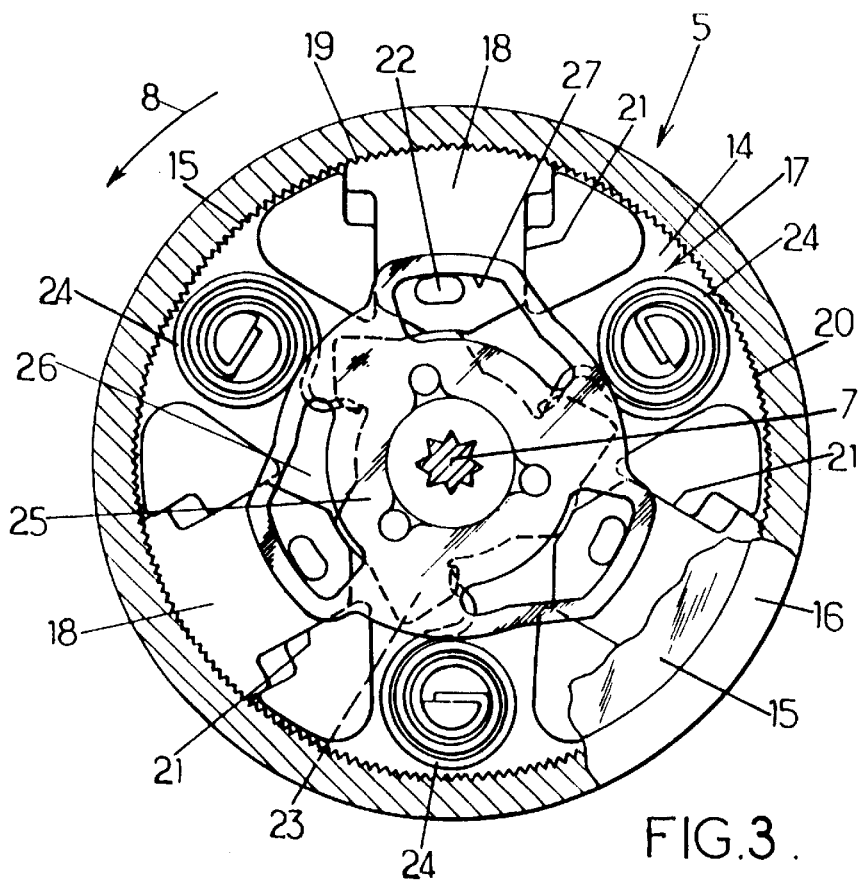

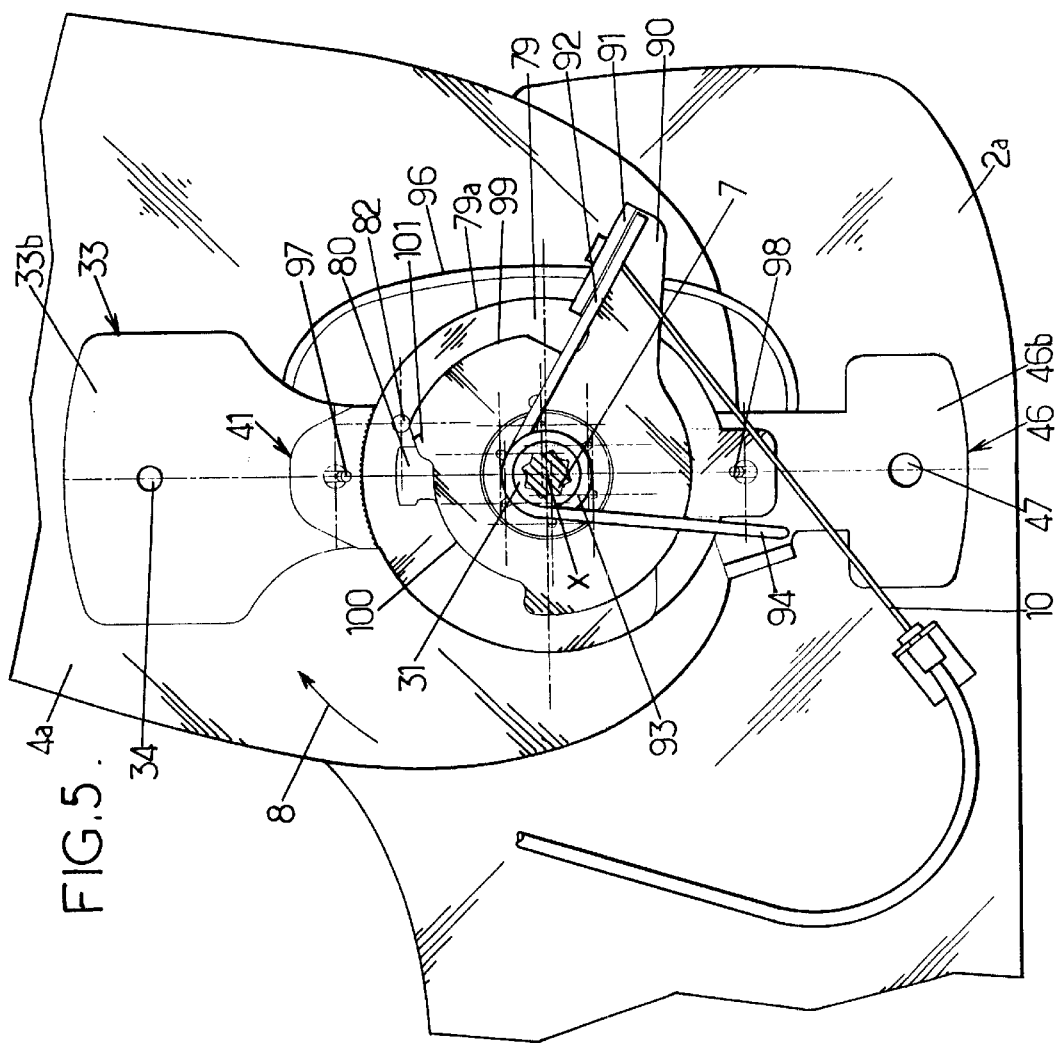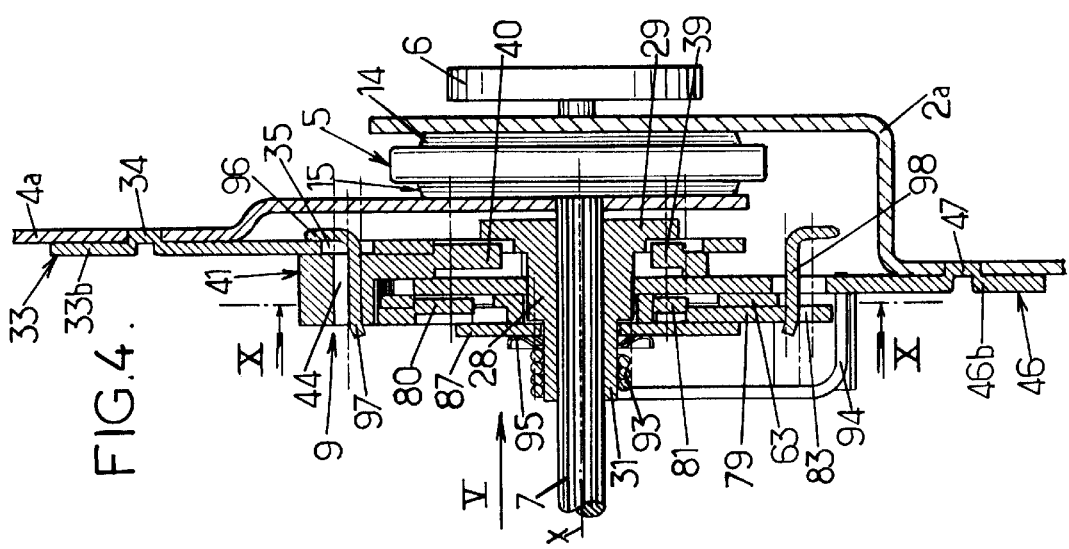

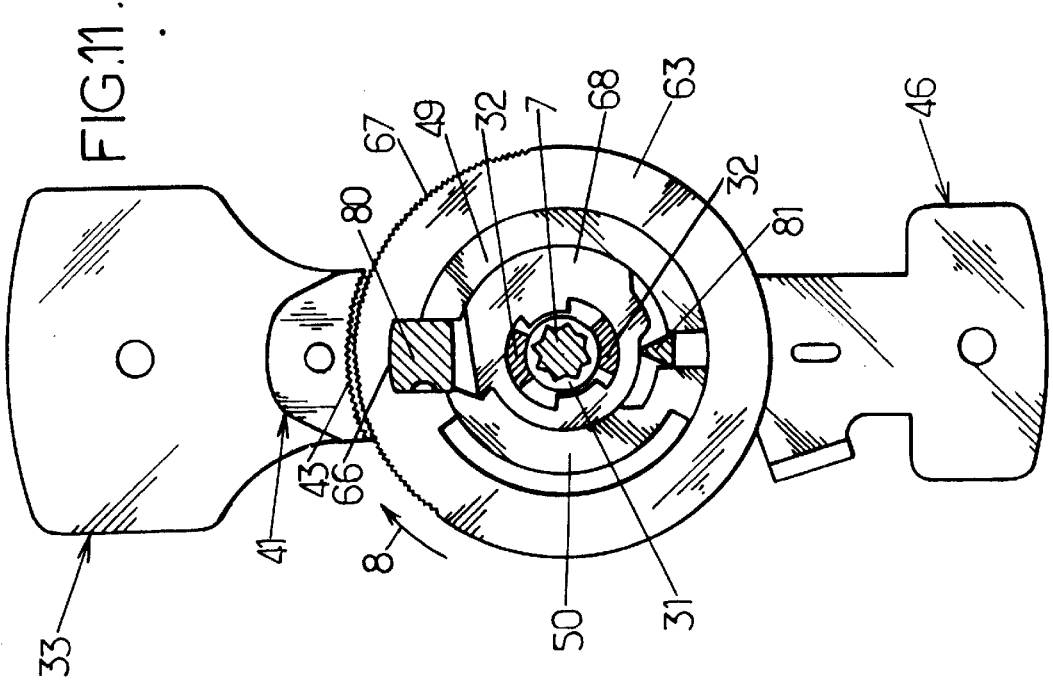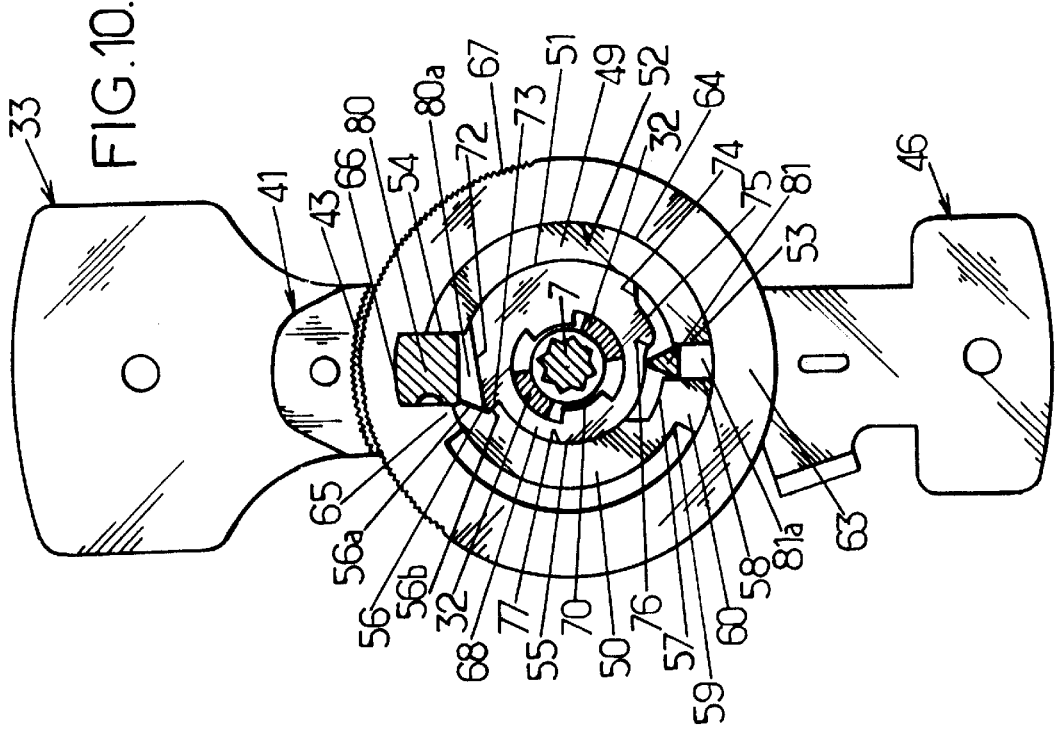

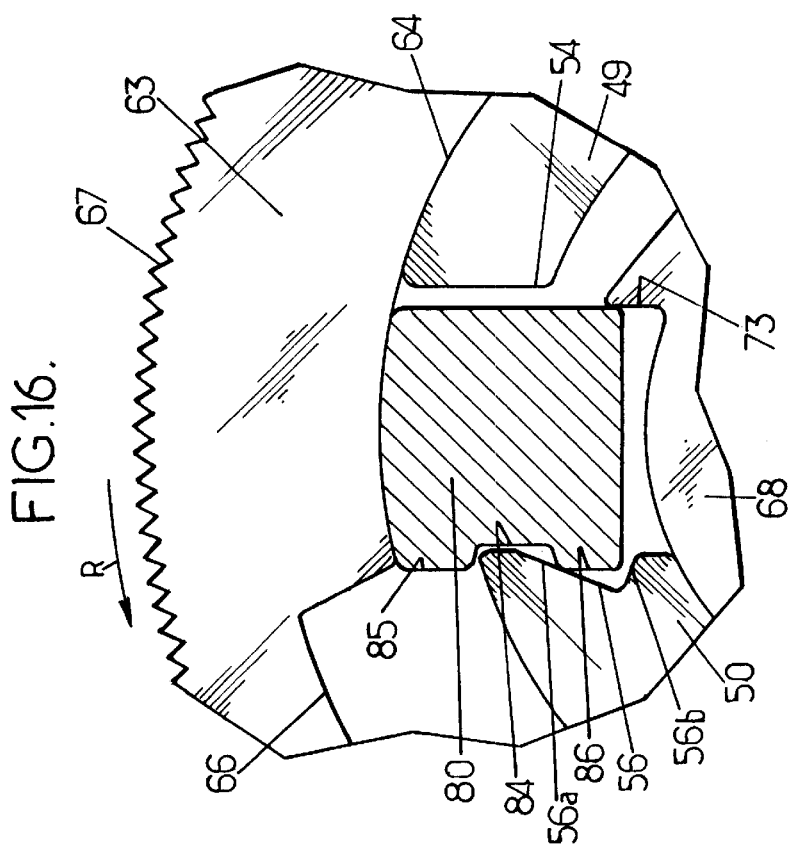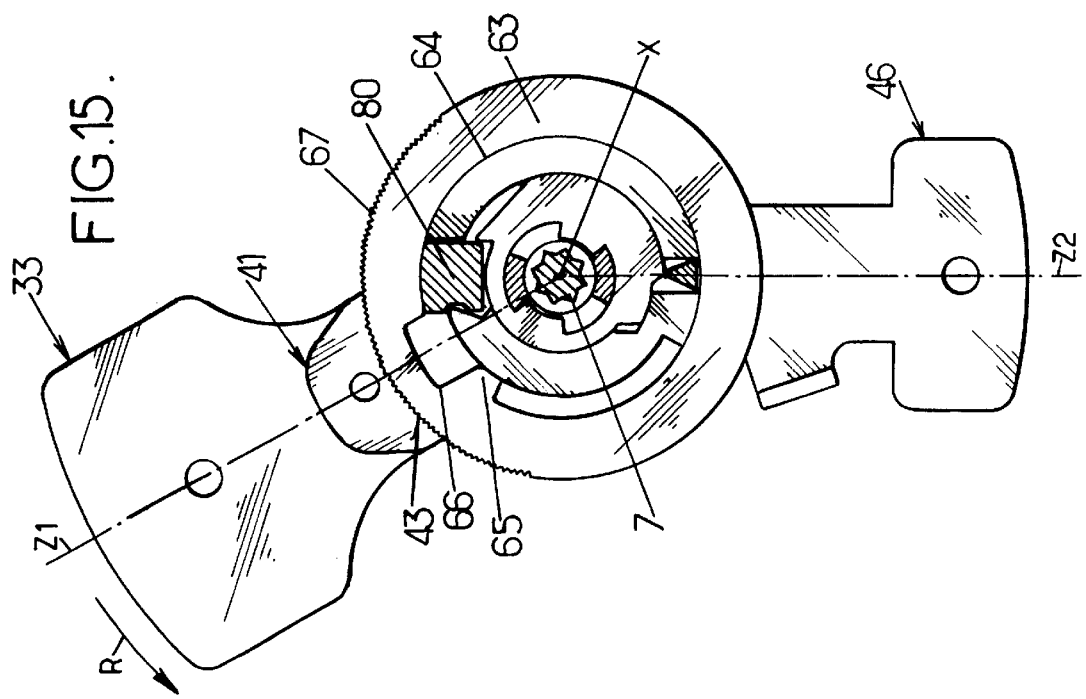

VEHICLE SEAT FITTED WITH A HINGE MECHANISM

FIELD OF THE INVENTION

The present invention relates to vehicle seats fitted with hinge mechanisms.

More particularly, the invention relates to the vehicle seat comprising:

first and second seat elements mounted to pivot relative to each other about a pivot axis;

at least one hinge mechanism including a locking device movable between firstly a locked position preventing relative pivoting between the first and second seat elements, and secondly an unlocked position enabling the first and second seat elements to pivot freely relative to each other, said locking device being controlled by a first drive member actuatable by a user, said first drive member being urged towards a rest position in which said first drive member places the locking device in its rest position, and the first drive member being movable in an actuation angular direction towards an actuation position in which said first drive member places the locking device in its unlocked position, the rest and actuation positions of the first drive member being fixed relative to the first seat element; and a memory mechanism movable between firstly a rest position in which said memory mechanism is adapted to avoid interfering with relative pivoting between the first and second seat elements, and secondly an active position in which said memory mechanism is adapted to:

enable the second seat element to pivot freely relative to the first seat element in a first angular direction away from the most recent adjusted relative position of said two seat elements; and then enable the second seat element to pivot relative to the first seat element in a second angular direction opposite to the first angular direction until it reaches said most recent adjusted relative position of said two seat elements;

the memory mechanism being controlled by a second drive member actuatable by a user, said second drive member being urged towards a rest position in which said second drive member places the memory mechanism in its rest position, and the second drive member being displaceable into an actuation position in which said second drive member places the memory mechanism in its active position.

BACKGROUND OF THE INVENTION

Document EP-A-0 694 434 describes a seat of that type intended in particular for the front seats of vehicles having two side doors, and in which the first and second seat elements are the seat proper and the seat back.

That prior art seat is provided with a hinge mechanism having toothed slugs and including a memory mechanism making it possible:

to adjust the position of the seat back; and to tilt the seat back down forwards, for example when it is desired to gain access to the back seats of the vehicle, and then to lock the seat back automatically again in the position as previously adjusted by the user.

The hinge mechanism of that known seat comprises first and second cheekplates and toothed slugs which are mounted to slide relative to the first cheekplate and which engage a set of teeth itself free to move relative to the second cheekplate, the set of teeth being lockable relative to the second cheekplate by means of other toothed slugs.

Under those circumstances, the two cheekplates of the hinge mechanism are therefore connected to each other via two stages of toothed slugs, thus tending to reduce the mechanical strength of the hinge, or making it necessary to increase the weight and the expense of the mechanism in order to obtain high mechanical strength.

Furthermore, the hinge mechanism is then a specific mechanism which means that it is produced in relatively short runs and is consequently relatively expensive compared with a standard hinge mechanism.

OBJECTS AND SUMMARY OF THE INVENTION

An object of the present invention is to mitigate those drawbacks.

To this end, the invention provides a seat of the kind in question:

wherein the hinge mechanism interconnects the first and second seat elements independently of the memory mechanism, which memory mechanism is in the form of a self-contained assembly distinct from the hinge mechanism;

wherein the memory mechanism comprises:

a memory plate mounted to pivot freely about the pivot axis independently of the first and second seat elements;

a first locking member connected to the second drive member and to the first seat element in such a manner as to be capable of moving relative to said first seat element as a function of the displacements of the second drive member, said first locking member co-operating with the memory plate to lock it relative to the first seat element when the second drive member is in its rest position, and the first locking member enabling the memory plate to pivot relative to the first seat element about the pivot axis when said second drive member is in its actuation position; and a second locking member connected to the second drive member and to the second seat element in such a manner as to be capable of moving relative to said second seat element as a function of the displacements of the second drive member, said second locking member co-operating with the memory plate to lock it relative to the second seat element when the second drive member is in its actuation position, and the second locking member enabling the memory plate to pivot about the pivot axis relative to the second seat element when said second drive member is in its rest position; and wherein the first and second drive members are connected to each other by a mechanical connection with lost motion which is adapted:

to leave the second drive member in its rest position when acting on the first drive member by moving it into its actuation position; and to drive the first drive member from its rest position to its actuation position when acting on the second drive member to move it from its rest position to its actuation position.

By means of these dispositions, when the user of the seat seeks to adjust the inclination of the seat back so as to improve comfort, the user acts on the first drive member, thereby releasing the hinge mechanism.

Because of the mechanical link with lost motion between the first and second drive members, and given that both drive members have rest positions and actuation positions that are fixed relative to the same seat element, the second drive member then remains at rest, such that the memory mechanism is itself in its rest state and does not interfere with the relative pivoting between the first and second seat elements.

In contrast, when the user of the seat seeks to pivot the second element of the seat quickly in the first angular direction (for example, when the first element is the seat back, so as to fold the seat back down forwards as far as it will go), the user acts on the second drive member, thereby not only releasing the hinge mechanism, but also enabling the memory mechanism to take up its memory position, limiting the relative pivoting movement of the first and second seat elements in such a manner that the second seat element returns finally to its initial position relative to the first seat element.

It should be observed that the hinge mechanism of the seat of the invention can be of standard construction, thus making it possible in particular to use the same hinge mechanisms for substantially all types of seat having a back whose position can be adjusted by the user acting directly on said back, regardless of whether or not the back can be folded down forwards to give access to the rear seat of the vehicle.

Because of this possibility of standardization, the invention leads to significant increases in productivity and consequently to a reduction in the overall cost of seats.

Because of this compatibility of the memory mechanism of the invention with standard hinge mechanisms, it is also possible to mount the hinge mechanism on the outside of seats that have already been assembled, when only some of the assembled seats are intended to enable the back to be folded down forwards in order to give access to the space situated behind the seat: under such circumstances, seat assembly can be standardized and the memory mechanism can be fitted at the last moment during the final stages of seat manufacture, as a function of demand. This option tends to further reduce the cost price of seats of the invention.

It should be observed that the memory mechanism of the invention is preferably assembled before being fitted to seat, which is made possible because said mechanism constitutes a self-contained assembly. This makes it easier to fit the mechanism to the seat.

Furthermore, the invention does not require the hinge mechanism to present two stages of toothed slugs, which means that it is possible to use a first hinge mechanism that is simple and strong. In any event, the mechanical strength of the first hinge mechanism is independent of the presence or the absence of the memory mechanism.

In preferred embodiments of the invention, one or more of the following dispositions may optionally be used:

the memory plate is annular in shape and is pivotally mounted on a first plate fixed to the first seat element, said memory plate having a circular inside edge centered on the pivot axis and an outside edge provided with a circular set of teeth likewise centered on the pivot axis, and the second locking member being provided with a circular set of teeth placed facing the set of teeth on the memory plate, the second locking member being movably mounted on a second plate secured to the second seat element so that the teeth of said second locking member can engage the teeth of the memory plate;

the second locking member is mounted to slide in a radial direction relative to the second plate;

the first locking member comprises at least one locking peg which, in the rest position of the memory mechanism, is engaged firstly in a radial inside notch formed in the memory plate, and secondly in a radial guide formed in the first plate, the locking peg being displaceable radially inwards when the second drive member is moved from its rest position to its actuation position, until said locking peg disengages from the inside notch of the memory plate, the circular inside edge of the memory plate being adapted then to engage on the locking peg when the seat back is folded down, preventing said first locking member from returning into its starting position so long as the seat back has not been returned to its most-recently adjusted position;

the first and second drive members are mounted to pivot about the pivot axis, the first locking member having a circular outside edge centered on the pivot axis, the teeth of said second locking member being resiliently urged radially towards the outside edge of said first locking member, the first locking member further including a guide peg and a bearing peg co-operating respectively by contacting first and second camming edges secured to the second drive member, the first camming edge being adapted to act on the guide peg so as to move the locking peg radially inwards while the second drive member is pivoting from its rest position to its actuation position, and the second camming edge being adapted to act on the bearing peg in such a manner as to place the first locking member in a radial position where the locking peg is engaged in the inside notch of the memory plate and where the outside edge of the second locking member holds the teeth of the second locking member apart from the teeth of the memory plate;

the second drive member is secured to at least one abutment which comes angularly into abutment against at least one complementary abutment secured to the first drive member while the second drive member is pivoting from its rest position to its actuation position, with a certain amount of angular clearance adapted to ensure that the second drive member does not drive the first drive member towards its actuation position until said second drive member has traveled over a first angular stroke, and the first camming edge being adapted so that while the second drive member is being actuated, the first locking member is moved radially far enough for the teeth of the second locking member to engage the teeth of the memory plate during said first angular stroke;

the first camming edge has first and second inclined ramps separated from each other by a circular edge, the first inclined ramp being adapted so that the guide peg follows said first inclined ramp during said first angular stroke, and the circular edge being adapted so that the hinge mechanism is unlocked while the guide peg is following said circular edge and the second drive member is moving towards its actuation position;

the seat back is urged resiliently in the first angular direction, the locking peg secured to the first plate, one of said guide faces forming an inclined ramp relative to a radial sliding direction for the locking peg, said inclined ramp being disposed so that said locking peg is urged against said inclined ramp while the seat back is being urged in the first angular direction, and said locking peg having a lateral projecting portion which bears against said inclined ramp, co-operating with said inclined ramp in such a manner as to urge the locking peg radially inwards while the seat back is being urged in the first angular direction;

the second drive member is secured to an abutment face which is adapted to come laterally into abutment against the locking peg thus holding the memory mechanism in the active position and holding the hinge mechanism in the unlocked position while the locking peg is bearing against the inside edge of the memory plate;

the memory mechanism includes a drive shaft which is secured to the first drive member and on which there are engaged all of the other elements belonging to the memory mechanism; and the first seat element is constituted by the seat proper and the second seat element is constituted by the seat back.

BRIEF DESCRIPTION OF THE DRAWINGS

Other characteristics and advantages of the invention appear from the following description of an embodiment, given by way of non-limiting example and with reference to the accompanying drawings.

In the drawings:

FIGS. 1 and 2 are diagrammatic views showing an example of a seat in accordance with the invention seen from the side and from in front;

FIG. 3 is a cutaway view of one of the hinge mechanisms of the seat shown in FIGS. 1 and 2;

FIG. 4 is a vertical section view through one of the sides of the seat of FIGS. 1 and 2, showing one of the hinge mechanisms and the memory mechanism of the seat;

FIG. 5 is a view looking along arrow V in FIG. 4;

FIG. 10 is a section view on direction X—X of FIG. 4, for the normal-use position of the seat;

FIGS. 11 to 13 are views similar to FIG. 10, respectively while adjusting the angular position of the seat back, and during two initial stages of actuating the memory mechanism;

FIG. 15 is a view similar to FIG. 13, during a third stage of actuating the memory mechanism, enabling the seat back to be folded down forwards so as to give access to the rear seats of the vehicle;

FIG. 16 is a detail view of FIG. 15; and

MORE DETAILED DESCRIPTION

Figure 6:
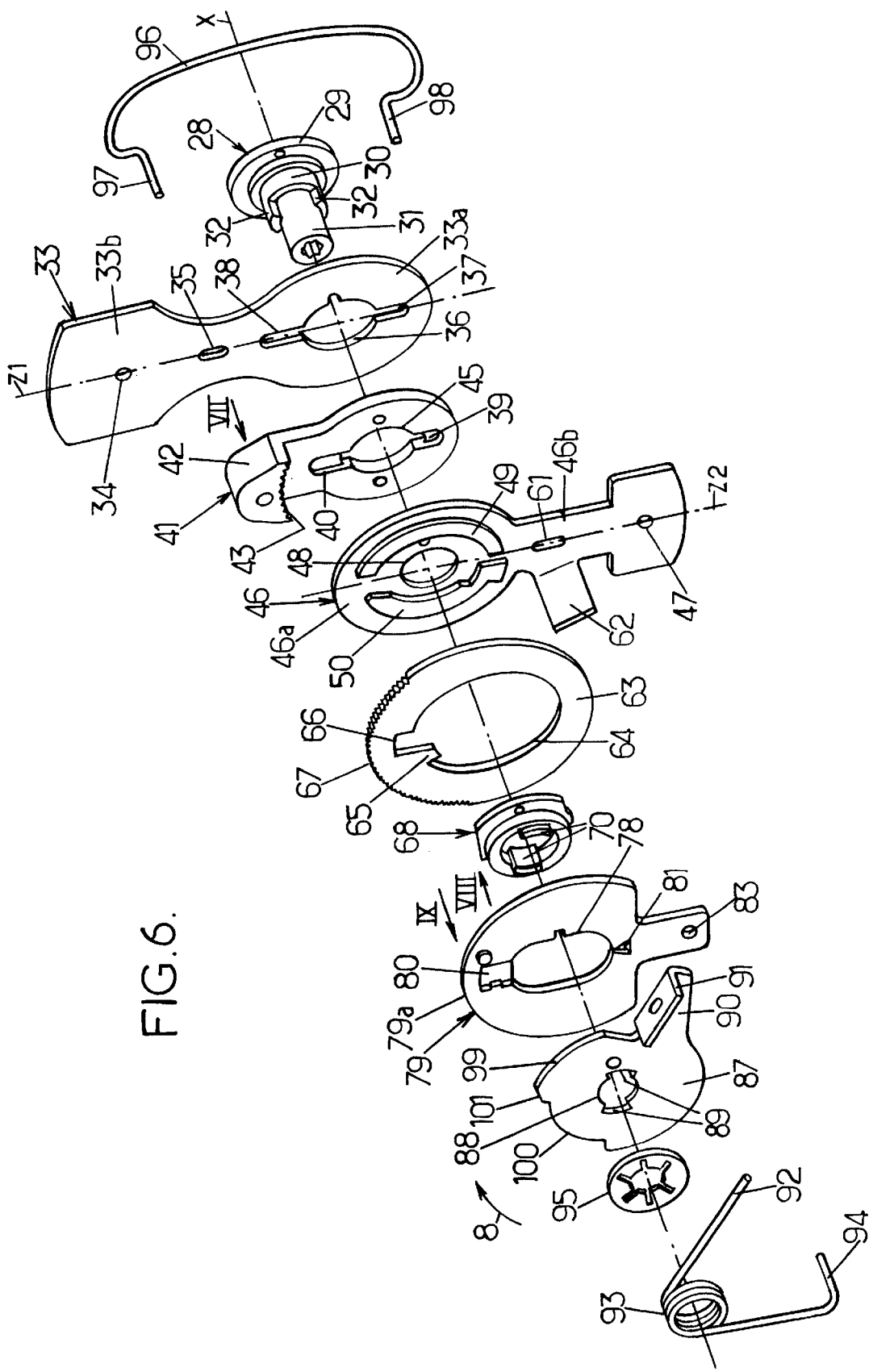
FIG. 6 is an exploded perspective view of an embodiment of the memory mechanism of the seat shown in FIGS. 1 and 2, this mechanism being shown in its position corresponding to the seat being in normal use.

In the various figures, the same references designate elements that are identical or similar.

As shown diagrammatically in FIGS. 1 and 2, the invention relates to a vehicle seat 1, in particular a front seat for a motor vehicle, which seat comprises at least first and second seat elements, namely firstly a seat proper 2 mounted on the floor 3 of the vehicle, and secondly a seat back 4 pivotally mounted on the seat proper 2 about a horizontal transverse axis X.

More precisely, the rigid strength member 4a of the back is connected to the rigid strength member 2a of the seat proper on either side of the seat via two hinge mechanisms 5 that are identical or similar and that are controlled by a common knob 6. This knob is secured to a rigid metal connection bar 7 which interconnects the two hinge mechanisms 5 and which extends along the axis X. Optionally, the seat could have only one hinge mechanism 5 on one side only of the seat, in which case the connection bar 7 would be omitted.

When the knob 6 is actuated in angular direction 8 shown in FIG. 1, both hinge mechanisms 5 are released simultaneously so that the user of the seat can adjust the inclination of the back 4 by acting directly on the back, with the back generally being urged forwards by at least one spring (not shown) such as one or more torsion bars.

Furthermore, one of the two hinge mechanisms 5 is associated with a memory mechanism 9 which is connected by a metal cable 10 or other mechanical connection to a handle 11 which is generally pivotally mounted to the back 4.

The handle 11 is urged towards a low, rest position by a spring 12, and it can be moved upwards by a user in the direction of arrow 13.

When the handle 11 is moved in the direction of arrow 13, as explained below, then both hinge mechanisms 5 are released so as to enable the back 4 to pivot forwards down as far as it will go in the direction of arrow R, so as to take up the position shown in chain-dotted lines in FIG. 1.

The memory mechanism 9 then holds the hinge mechanisms 5 in their unlocked position even after the handle 11 has been released, until the back 4 has been raised into its initial position, i.e. into the most recent angular position to have been set by the user.

Thus, the memory mechanism 9 guarantees that after the seat back has been folded down forwards and then lifted up again, it will become locked in position again only once it has returned to its initial position.

In the example described, the means which enable these functions to be performed are as described in greater detail below.

Firstly, as shown in FIG. 3, each of the two hinge mechanisms 5 comprises:

a "fixed" metal cheekplate 14 extending perpendicularly to the axis X and, in this example, secured to the rigid strength member 2a of the seat proper;

a "moving" metal cheekplate 15 which extends perpendicularly to the axis X and which, in this example, is secured to the strength member 4a of the seat back;

a metal ring 16 which is crimped around the fixed and moving cheekplates 14 and 15 so as to co-operate therewith to define a closed circular housing; and a slug locking device 17 contained within said housing and adapted to prevent the moving cheekplate 15 from moving relative to the corresponding fixed cheekplate 14 so long as the knob 6 is in its rest position.

In the example described, the locking device 17 comprises:

three metal locking slugs 18 disposed at 120° to one another and each possessing an outwardly-directed set of teeth 19 adapted to engage with an inwardly-directed circular set of teeth 20 formed in the moving cheekplate 15, with each of the slugs being mounted to slide radially in a guide 21 which is secured to the corresponding fixed cheekplate 14, so that the slugs can be moved between firstly an engaged position in which the teeth 19 of the slugs engage the teeth 20 of the corresponding moving cheekplate so as to lock the hinge mechanism 5, and secondly a retracted position in which the slugs 18 no longer co-operate with the teeth 20 of the moving cheekplate, each slug further comprising a peg 22 which projects axially towards the moving cheekplate 15;

a metal cam 23 or first drive member which is secured to the connection bar 7 (or with an endpiece secured to said connection bar), in the example described by engaging on fluting on said connection bar;

springs 24 mounted on the fixed cheekplate 14 and urging the cam 23 towards a rest position in which it places the slugs 18 in their engaged position, said cam being capable of pivoting in the angular direction 8 so as to enable the slugs 18 to slide towards their retracted position so as unlock the hinge mechanism 5; and a rigid metal plate 25 which is rigidly connected to the cam 23 and which extends radially between said cam and the moving cheekplate 15, partially overlying the slugs 18, said plate having three cutouts 26 in which the pegs 22 of the slugs are engaged, each of the pegs co-operating with a corresponding cam edge 27 defining the corresponding cutout in a radially outward direction and which is shaped to move the corresponding slug radially inwards when the cam turns in the angular direction 8.

Thus, the locking slugs 18 of the two hinge mechanisms 5 are to be found simultaneously either in their retracted positions when the corresponding cams 23 are in the rest position, or else in their engaged positions when the cams 23, the knob 6, and the connection bar 7 are turned through at least a first angular stroke α1 in the angular direction 8 away from the rest position, where the knob 6 and the connection bar 7 are capable of turning through a total angle α2 which is greater than α1 (for example α2 can be equal to 20° to 30°).

It should be observed that the rest and actuated positions of the cams 23 and of the knob 6 are fixed relative to the seat proper 2. It would be possible, where appropriate, to provide for the rest and actuated positions of the cams 23 and of the knob 6 to be fixed relative to the seat back 4, in which case the elements of the memory mechanism 9 that are described below as being fixed to the seat proper would need to be fixed relative to the seat back, and the elements of the memory mechanism which are described below as being fixed to the seat back would need to be fixed relative to the seat proper.

With reference to the memory mechanism 9, reference is made initially to FIGS. 4 to 6 where this mechanism is shown clearly in its rest position.

The memory mechanism 9 comprises firstly a metal drive shaft 28 which extends longitudinally along the axis X and which is engaged on the connection bar 7, so as to be constrained to turn therewith.

At its end situated towards the knob 6 (FIG. 4) for example, the drive shaft 28 has an annular collar 29 which projects radially outwards.

The drive shaft 28 also has a circularly cylindrical portion 30 which extends along the axis X from the collar 29 and which is extended away from said collar by:

a circularly cylindrical portion 31 of smaller diameter; and two actuation fingers 32 extending the cylindrical portion 30 and projecting radially outwards from the cylindrical portion 31 (FIG. 6).

The memory mechanism 9 also has a moving plate 33 of sheet metal which is secured to the strength member 4a of the seat back, e.g. by welding via a stamping 34 penetrating into a recess in the strength member 4a of the seat back.

This moving plate 33 extends in a plane that is perpendicular to the axis X, and it has a circular central portion 33a extended radially outwards by an arm 33b which includes said stamping 34 and which is pierced by an oblong slot 35 extending in a radial direction Z1 relative to the axis X.

Figure 7:
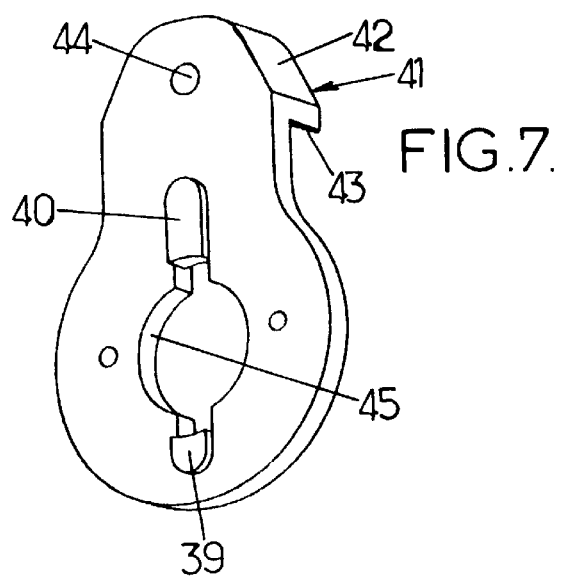
FIGS. 7 to 9 are detail views showing three elements of the FIG. 6 mechanism, as seen respectively looking along arrows VII, VIII, and IX in said FIG. 6.

The central portion 33a of the plate 33 has a circular central hole 36 with the drive shaft 28 passing freely therethrough. The central hole 36 is extended in the radial direction Z1 by two cutouts 37, 38 (FIG. 6) respectively receiving stamped projections 39, 40 (FIGS. 6 and 7) of a memory slug 41.

The memory slug 41 is in the form of a sheet metal plate extending perpendicularly to the axis X, and pressed against the face of the moving plate 33 that faces away from the knob 6 and that is guided to slide in the above-mentioned direction Z1 relative to the moving plate 33 by means of the stamped projections 39 & 40 which are engaged in the cutouts 37 & 38.

The memory slug 41 has a projecting portion 42 of greater thickness which extends away from the moving plate 33 and which has a set of teeth occupying a circular arc 43 facing radially inwards and centered on the axis X. In addition, the projecting portion 42 of the memory slug 41 is pierced by a hole 44 placed to correspond with the above-mentioned oblong slot 35 of the moving plate 33. Finally, the memory slug 41 is pierced by an oblong slot 45 which is elongate in the direction Z1 and which has the drive shaft 28 passing freely therethrough.

The memory mechanism 9 also has a fixed plate 46 of sheet metal which is fixed to the strength member 2a of the seat proper, e.g. by welding via a stamped zone 47 which penetrates into a recess in the strength member 2a, said fixed plate extending in a plane perpendicular to the axis X.

The fixed plate 46 has a circular portion 46a centered on the axis X and placed in contact with the face of the memory slug 41 that is situated away from the moving plate 33, said circular portion 46a being situated radially inside the set of teeth 43 of the memory slug. The circular portion 46a of the fixed plate 46 has a circular central hole 48 with the drive shaft 28 passing freely therethrough.

Furthermore, the central portion 46a also has two circular guides 49, 50 centered on the axis X which are stamped in relief on the face of the plate 46 facing away from the memory slug 41 (see FIGS. 6 and 10) and which are disposed substantially symmetrically about a radial direction Z2.

The circular guide 49 has inside and outside edges respectively referenced 51 and 52 which extend angularly over slightly less than 180° between two end faces 53, 54 parallel to the above-mentioned direction Z2.

Furthermore, the circular guide 50 also extends over a little less than 180°, and has an inside radial edge 55 of smaller diameter than the inside edge 51 of the guide 49, said inside edge 55 extending from a first end face 56 placed facing the end face 54 of the guide 49 to an enlargement 57 of greater diameter which itself extends as far as an end face 58 placed facing the end face 53 of the guide 49.

The end face 58 of the guide 50 is parallel to the radial direction Z2, while the end face 56 of the guide 50 is in the form of an open V-shape directed towards the end face 54 of the guide 49, with said end face 56 thus forming two projecting tips 56a, 56b.

Furthermore, the guide 50 has an outside edge 59 of smaller diameter than the outside edge 52 of the guide 49, said outside edge 59 extending angularly from the end face 46 to a portion 60 that projects radially outwards from the end face 58, said projecting portion 60 having an outside diameter that is equal to the diameter of the outside edge 52 of the guide 49.

In addition, the fixed plate 46 also has a fixing arm 46b which projects radially in the direction Z2 and which includes the above-mentioned stamped zone 47, the fixing arm 46b also having an oblong slot 61 extending parallel to the direction Z2, and a folded tab 62 folded substantially parallel to the axis X away from the memory slug 41 (see FIG. 6).

The above-mentioned circular guides 49 and 50 serve to guide a memory plate 63 made of sheet metal in rotation about the axis X, this plate extending perpendicularly to the axis X and being generally in the form of a circle centered on said axis X, as can be seen in detail in FIGS. 6 and 10.

The memory plate 63 is put into contact with the face of the circular portion 46a of the fixed plate having the circular guides 49 and 50. Said memory plate 63 is annular in shape and has a circular inside edge 64 which presents the same diameter as the above-mentioned outside edge 52 of the guide 49 and which is engaged snugly against said edge 52.

In addition, the memory plate 63 has an abutment finger 65 which projects radially inwards and which bears against the outside edge 59 of the guide 50.

The memory plate 63 also has an inside notch 66 in its inside edge 64, the notch 66 being placed to coincide with a passage 80a formed between the end faces 54 and 56 of the guides 49 and 50. Finally, the memory plate 63 also includes, over at least a fraction of its circular outside edge, an outwardly-directed circular set of teeth 67 placed facing the set of teeth 43 of the memory slug 41, but which does not engage with said set of teeth 43 when the memory mechanism 9 is in the rest position.

In addition, a metal cam 68 is placed in contact with the central portion of the fixed plate 46.

Figure 8:
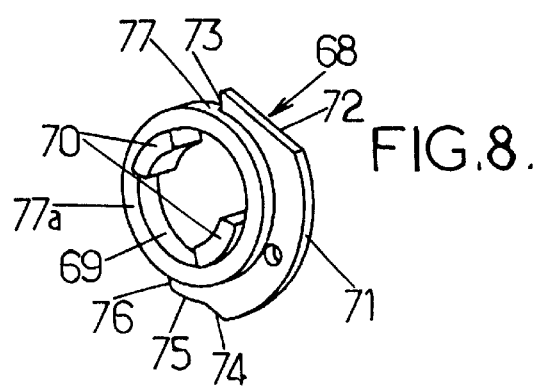

As can be seen in greater detail in FIGS. 8 and 10, the cam 68 has a central passage 69 through which there passes the small-diameter cylindrical portion 31 and the two drive fingers 32 of the drive shaft 28. The cam 68 itself has two drive fingers 70 which project radially inwards into its central passage 69 and which co-operate angularly by coming into abutment against the drive fingers 32 of the drive shaft 28, while leaving a certain amount of angular clearance in both directions. In addition, the drive fingers 70 of the cam 68 project axially parallel to the axis X, away from the fixed plate 46.

Furthermore, the cam 68 has a circular outside edge 71 centered on the axis X, and extended at one end by a straight cut flat 72 extending to an end face 73. In the rest position of the memory mechanism 9, this end 73 comes into abutment against the end face 56 of the guide 50 of the fixed plate 46.

At its end opposite from the cut flat 72, the circular edge 71 is extended by a ramp 73 extending radially inwards at an angle, and then by a circular edge 75 itself extended by a ramp 76 extending radially inwards at an angle to a circular edge 77 of smaller diameter. This circular edge 77 is extended axially by a circular collar 77a which projects away from the fixed plate 46.

Figure 9:
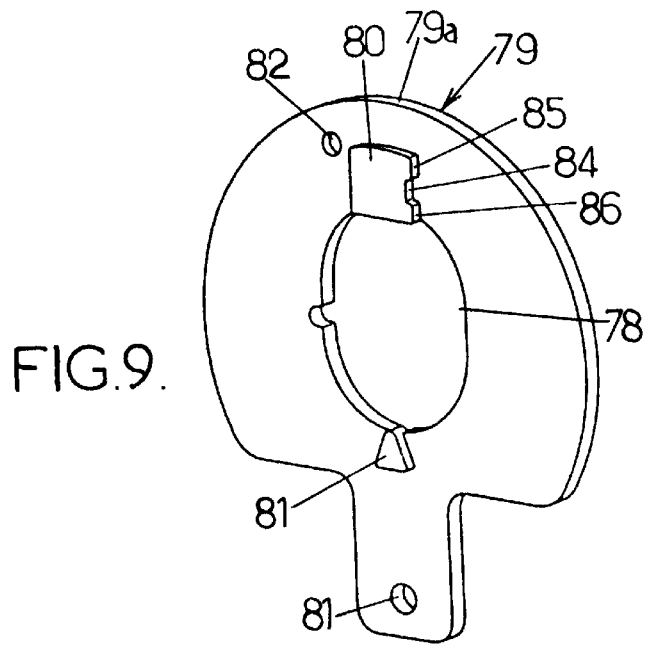

The collar 77a of the cam 68 is engaged in an oblong central slot 78 which is elongate in the direction Z2, and formed in a locking slug 79 made of sheet metal (see in particular FIGS. 6 and 9).

The locking slug 79 is pressed against the memory plate 63 and the cam 68 away from the fixed plate 46, and it is stamped so as to present:
  a locking peg 80 projecting towards the fixed plate 46, this locking peg 80 being engaged both in the passage 80a of the fixed plate and in the notch 66 of the memory plate when the memory mechanism 9 is in the rest position;
  a guide peg 81 which also projects towards the fixed plate 46 and which is engaged in a passage 81a formed between the end faces 53 and 58 of the guides 49 and 50 of said fixed plate (see FIG. 10), said guide peg 81 bearing against the smaller-diameter edge 77 of the cam 68 when the memory mechanism 9 is in its rest position; and
  a bearing peg 82 which projects away from the memory plate 68, close to the locking peg 80.

In addition, the locking slug 79 also has a hole 83 placed to correspond with the slot 61 in the fixed plate 46.

Advantageously, on its side that corresponds with the end face 56 of the guide 50 of the fixed plate, the locking peg 80 has a lateral notch 84 (see FIG. 9) which is located between two projecting lateral portions 85 and 86 disposed respectively radially on the outside and radially on the inside of the notch 84.

As shown in FIGS. 5 and 6, the locking slug 79 is covered, away from the memory plate 63, by a control plate 87 in the form of a sheet metal plate extending perpendicularly to the axis X. The control plate 87 or second drive member has a circular central cutout 88 through which the smaller-diameter cylindrical portion 31 of the drive shaft 28 passes freely, and said circular cutout 88 is extended radially outwards by two notches 89 which receive snugly the projecting fingers 70 of the cam 68 so that the control plate 87 is constrained to rotate with said cam 68.

The control plate 87 also has a lever 90 fitted with a folded edge 91 having the above-mentioned cable 10 fixed thereto and against which there bears one branch 92 of a spring 93 whose other branch 94 bears against the folded tab 62 of the fixed plate, so as to urge the control plate 87 and the cam 68 in the direction opposite to the angular direction 8.

The spring 93 is advantageously wound around the free end of the smaller-diameter cylindrical portion 31 of the drive shaft 28, a spring washer 95 also being engaged on said smaller-diameter cylindrical portion against the control plate 87 so that the memory mechanism 9 forms a self-contained assembly that can be assembled in advance and then fitted to the vehicle seat merely by being welded via the stamped portions 34 and 46 as mentioned above (or it can be fitted using any other type of fastening, e.g. using screws or some other means).

Finally, a substantially Ω-shaped spring 96 is placed between the moving plate 33 and the strength members 2a and 4a of the seat proper and the seat back. The spring 96 has two end branches 97 and 98, one of which is engaged in the oblong slot 35 of the moving plate and in the hole 44 of the memory slug, and the other one of which is engaged in the oblong slot 61 of the fixed plate and in the hole 83 of the memory slug.

The spring 96 urges the teeth 43 of the memory slug towards the circular outside edge 79a of the locking slug, the teeth 43 bearing against said circular edge 79a when the memory mechanism 9 is in its rest position (see FIG. 5).

Furthermore, as can also be seen in FIG. 5, the control plate 87 has a circular outside edge 99 which is interrupted by a notch 100, which notch is extended at one of its ends by a ramp 101 that slopes radially outwards and that connects said notch to the circular edge 99. In the rest position of the memory mechanism 9, the bearing peg 82 of the locking slug 79 bearings against the circular outside edge 99 of the control plate, at the end of the ramp 101, so that the teeth 43 of the locking slug do not come into engagement with the teeth 67 of the memory plate 63.

The above-described device operates as follows.

Firstly, as shown in FIG. 11, when the user of the seat actuates the knob 6 so as to adjust the inclination of the seat back in order to improve the comfort thereof, turning the knob 6 and the connection bar 7 in the angular direction 8 through the above-mentioned angle α2 gives rise to no movement of the cam 68 insofar as the initial angular clearance provided between the drive fingers 32 of the drive shaft 28 and the drive fingers 70 of the cam 68 is greater than said angle α2 in the direction of rotation 8 of the drive shaft 28. The memory mechanism 9 thus remains in its rest position so that the memory plate 63 remains secured to the seat proper via the locking peg 80, while the memory slug 41 follows the pivoting movement of the seat back together with the moving plate 33.

In contrast, when the user actuates the handle 11 so as to apply traction to the cable 10, that causes the control plate 87 to pivot together with the cam 68 in the direction of arrow 8 as can be seen in FIG. 5.

Figure 12:
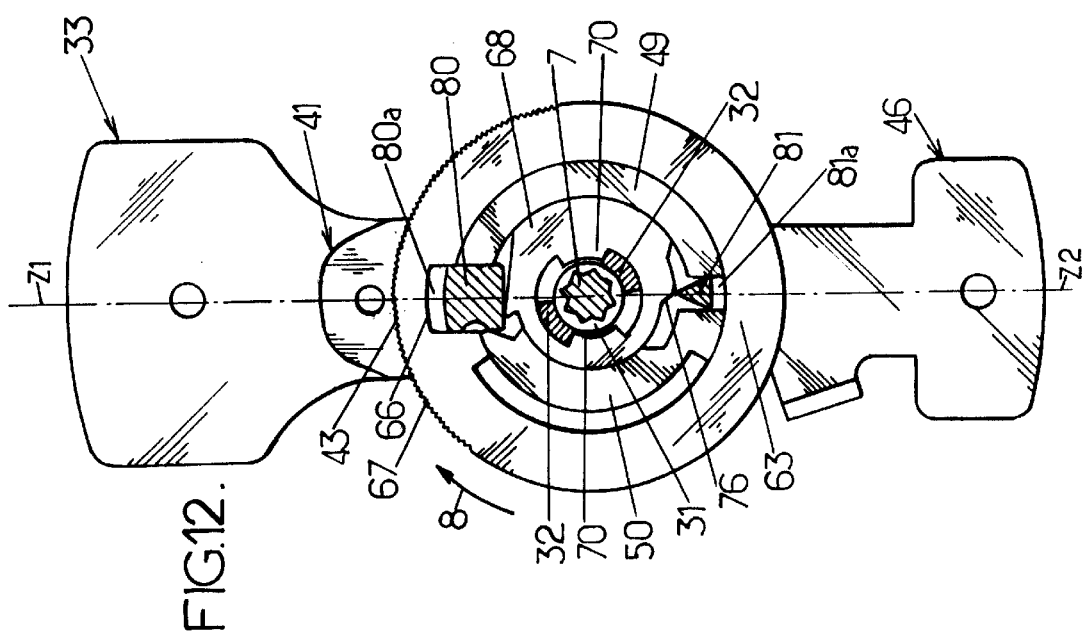

Initially, as shown in FIG. 12, this pivoting causes the guide peg 81 to pass over the ramp 76 of the cam, and simultaneously the bearing peg 82 of the locking slug to pass over the ramp 101 of the control plate, so that the locking slug 79 is moved in the direction Z2 towards the arm 46b of the fixed plate.

Since the memory slug 41 is urged towards the locking slug 79 by the spring 96, said memory slug moves in the direction Z1 following the locking slug (in FIG. 12, the memory mechanism 9 is shown with its directions Z1 and Z2 coinciding for greater convenience, however the direction Z1 can be inclined at an acute angle relative to the direction Z2, depending on the particular inclination to which the seat back has previously been set by the user of the seat).

Thus, the teeth 43 of the memory slug engage the teeth 67 of the memory plate.

Furthermore, in the first stage of actuation as shown in FIG. 12, the drive fingers 70 of the cam 68 come just into abutment against the drive fingers 32 of the drive shaft 28 without causing the drive shaft to turn, the angle of rotation of the cam 68 being just sufficient to take up the angular clearance that initially exists between the drive fingers 32 and 70 in the direction of rotation 8 of the cam 68.

Figure 14:
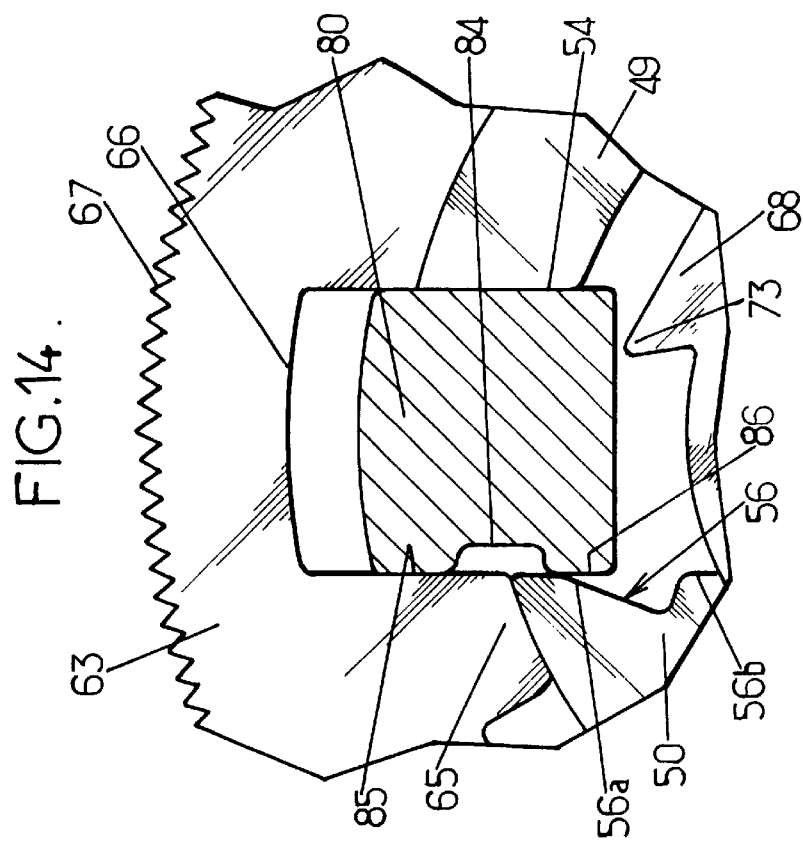
FIG. 14 is a detail view of FIG. 13.
Figure 13:
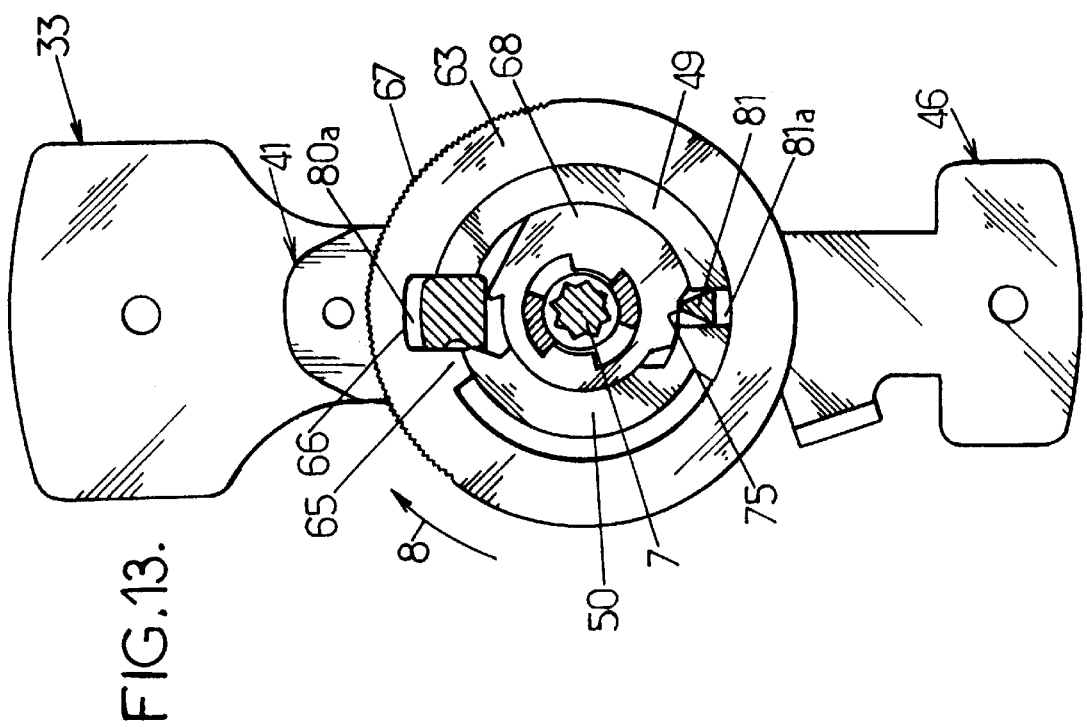

When the user of the seat continues to move the handle 11, as shown in FIGS. 13 and 14, the circular edge 76 of the cam 68 moves in contact with the guide peg 81 of the locking slug, so that the locking slug does not move until the guide peg 81 reaches the end of the ramp 75 of the cam.

During this movement, the drive fingers 70 of the cam co-operate with the drive fingers 32 of the drive shaft 28 by coming into abutment therewith, so that the connection bar 7 pivots through the above-mentioned angle α1 in the angular direction 8, releasing the hinge mechanisms 5 on either side of the seat. At this stage, the seat back 4 of the seat still does not pivot forwards, insofar the locking peg 80 is still partially engaged in the notch 66 of the memory plate 63, and also in the passage 80a defined between the end faces 54 and 56 of the guides 49 and 50 of the fixed plate.

Nevertheless, it should be observed that in this position, if the user presses hard against the back 4 so as to cause it to pivot, this will cause the teeth 43 of the memory slug to disengage successively from the teeth 67 of the memory plate: this loses the memory of the most-recently adjusted angular position of the back as set by the user, but it prevents damaging the memory mechanism 9.

As shown in FIG. 14, when the beginning of the ramp 74 of the cam 68 coincides with the guide peg 81, the projecting portion 86 of the locking peg 80 reaches the end of the top tip 56a of the end face 56 of the guide 50, which top tip forms an inclined ramp.

During continued movement of the handle 11, when the ramp 74 of the cam passes over the guide peg 81, again moving the locking slug 79 towards the arm 56b of the fixed plate, the projecting portion 86 of the locking peg tends to move towards the arm 56b of the fixed plate 56 along the ramp formed by the tip 56a of the guide 50 under drive from resilient means which urge the seat back and thus the memory plate 63 in the direction R so as to fold down the back (see FIG. 14), so that the notch 84 of the locking peg 80 engages on the tip 56a of the guide 50 (see FIG. 16): the ramp formed by the tip 56a thus facilitates radial displacement of the locking slug against the resilient urging of the spring 96, thus reducing the amount of force required to actuate the mechanism.

As soon as the locking peg 80 has been moved radially inwards far enough to be no longer engaged in the notch 66 of the memory plate 63, the back 4 can pivot freely in the direction R as shown in FIGS. 15 and 16, and can thus be folded down into the position shown in chain-dotted lines in FIG. 1.

During this movement, the peg 80 bears radially against the inside edge 64 of the memory plate, and after the user has released the handle 11, the end face 73 of the cam 68 comes into abutment laterally against the peg 80, said face 73 then facing in the radial direction parallel to the corresponding side edge of the slug: the memory mechanism thus remains in the active position and the hinge mechanisms remain in the unlocked position.

Figure 17:
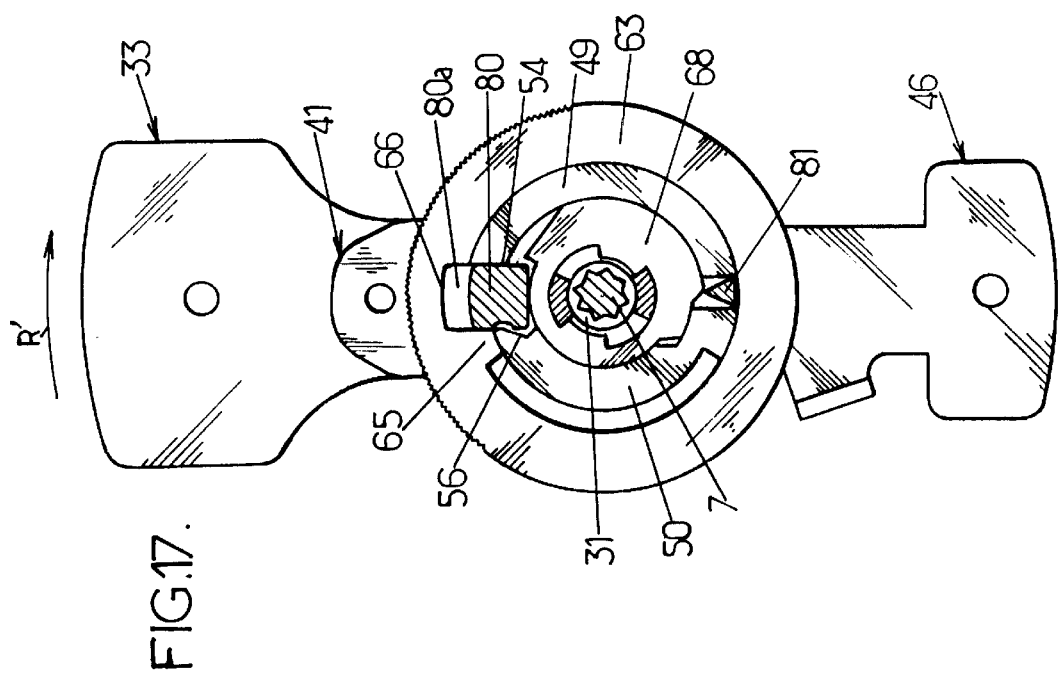
FIG. 17 is a view similar to FIG. 16, showing the memory mechanism while raising the seat back after it has been folded down forwards.

Thereafter, when the back is raised in the direction R' opposite to the direction R, as shown in FIG. 17, the abutment finger 65 of the memory plate 63 comes to bear against the projecting portion 85 of the locking peg 80, thereby returning said locking peg into abutment against the end face 54 of the circular guide 49 and enabling said locking peg to engage again in the notch 66 of the memory plate 63, enabling the memory mechanism and the hinge mechanisms to return to their rest positions.

What is claimed is:

1. A vehicle seat comprising:

first and second seat elements mounted to pivot relative to each other about a pivot axis;

at least one hinge mechanism including a locking device movable between firstly a locked position preventing relative pivoting between the first and second seat elements, and secondly an unlocked position enabling the first and second seat elements to pivot freely relative to each other, said locking device being controlled by a first drive member actuatable by a user, said first drive member being urged towards a rest position in which said first drive member places the locking device in its rest position, and the first drive member being movable in an actuation angular direction towards an actuation position in which said first drive member places the locking device in its unlocked position, the rest and actuation positions of the first drive member being fixed relative to the first seat element; and a memory mechanism movable between firstly a rest position in which said memory mechanism is adapted to avoid interfering with relative pivoting between the first and second seat elements, and secondly an active position in which said memory mechanism is adapted to:
  enable the second seat element to pivot freely relative to the first seat element in a first angular direction away from the most recent adjusted relative position of said two seat elements; and
  then enable the second seat element to pivot relative to the first seat element in a second angular direction opposite to the first angular direction until it reaches said most recent adjusted relative position of said two seat elements;
the memory mechanism being controlled by a second drive member actuatable by a user, said second drive member being urged towards a rest position in which said second drive member places the memory mechanism in its rest position, and the second drive member being displaceable into an actuation position in which said second drive member places the memory mechanism in its active position;
wherein the hinge mechanism interconnects the first and second seat elements independently of the memory mechanism, which memory mechanism is in the form of a self-contained assembly distinct from the hinge mechanism;
wherein the memory mechanism comprises:
  a memory plate mounted to pivot freely about the pivot axis independently of the first and second seat elements;
  a first locking member connected to the second drive member and to the first seat element in such a manner as to be capable of moving relative to said first seat element as a function of the displacements of the second drive member, said first locking member co-operating with the memory plate to lock it relative to the first seat element when the second drive member is in its rest position, and the first locking member enabling the memory plate to pivot relative to the first seat element about the pivot axis when said second drive member is in its actuation position; and
  a second locking member connected to the second drive member and to the second seat element in such a manner as to be capable of moving relative to said second seat element as a function of the displacements of the second drive member, said second locking member co-operating with the memory plate to lock it relative to the second seat element when the second drive member is in its actuation position, and the second locking member enabling the memory plate to pivot about the pivot axis relative to the second seat element when said second drive member is in its rest position; and
wherein the first and second drive members are connected to each other by a mechanical connection with lost motion which is adapted:
  to leave the second drive member in its rest position when acting on the first drive member by moving it into its actuation position; and
  to drive the first drive member from its rest position to its actuation position when acting on the second drive member to move it from its rest position to its actuation position.

2. A seat according to claim 1, in which the memory plate is annular in shape and is pivotally mounted on a first plate fixed to the first seat element, said memory plate having a circular inside edge centered on the pivot axis and an outside edge provided with a circular set of teeth likewise centered on the pivot axis, and the second locking member being provided with a circular set of teeth placed facing the set of teeth on the memory plate, the second locking member being movably mounted on a second plate secured to the second seat element so that the teeth of said second locking member can engage the teeth of the memory plate.

3. A seat according to claim 2, in which the second locking member is mounted to slide in a radial direction relative to the second plate.

4. A seat according to claim 3, in which the first locking member comprises at least one locking peg which, in the rest position of the memory mechanism, is engaged firstly in a radial inside notch formed in the memory plate, and secondly in a radial guide formed in the first plate, the locking peg being displaceable radially inwards when the second drive member is moved from its rest position to its actuation position, until said locking peg disengages from the inside notch of the memory plate, the circular inside edge of the memory plate being adapted then to engage on the locking peg when the seat back is folded down, preventing said first locking member from returning into its starting position so long as the seat back has not been returned to its most-recently adjusted position.

5. A seat according to claim 4, in which the first and second drive members are mounted to pivot about the pivot axis, the first locking member having a circular outside edge centered on the pivot axis, the teeth of said second locking member being resiliently urged radially towards the outside edge of said first locking member, the first locking member further including a guide peg and a bearing peg co-operating respectively by contacting first and second camming edges secured to the second drive member, the first camming edge being adapted to act on the guide peg so as to move the locking peg radially inwards while the second drive member is pivoting from its rest position to its actuation position, and the second camming edge being adapted to act on the bearing peg in such a manner as to place the first locking member in a radial position where the locking peg is engaged in the inside notch of the memory plate and where the outside edge of the second locking member holds the teeth of the second locking member apart from the teeth of the memory plate.

6. A seat according to claim 5, in which the second drive member is secured to at least one abutment which comes angularly into abutment against at least one complementary abutment secured to the first drive member while the second drive member is pivoting from its rest position to its actuation position, with a certain amount of angular clearance adapted to ensure that the second drive member does not drive the first drive member towards its actuation position until said second drive member has traveled over a first angular stroke, and the first camming edge being adapted so that while the second drive member is being actuated, the first locking member is moved radially far enough for the teeth of the second locking member to engage the teeth of the memory plate during said first angular stroke.

7. A seat according to claim 6, in which the first camming edge has first and second inclined ramps separated from each other by a circular edge, the first inclined ramp being adapted so that the guide peg follows said first inclined ramp during said first angular stroke, and the circular edge being adapted so that the hinge mechanism is unlocked while the guide peg is following said circular edge and the second drive member is moving towards its actuation position.

8. A seat according to claim 7, in which the seat back is urged resiliently in the first angular direction, the locking peg is guided radially between two guide faces secured to the first plate, one of said guide faces forming an inclined ramp relative to a radial sliding direction for the locking peg, said inclined ramp being disposed so that said locking peg is urged against said inclined ramp while the seat back is being urged in the first angular direction, and said locking peg having a lateral projecting portion which bears against said inclined ramp, co-operating with said inclined ramp in such a manner as to urge the locking peg radially inwards while the seat back is being urged in the first angular direction.

9. A seat according to claim 5, in which the second drive member is secured to an abutment face which is adapted to come laterally into abutment against the locking peg thus holding the memory mechanism in the active position and holding the hinge mechanism in the unlocked position while the locking peg is bearing against the inside edge of the memory plate.

10. A seat according to claim 1, in which the memory mechanism includes a drive shaft which is secured to the first drive member and on which there are engaged all of the other elements belonging to the memory mechanism.

11. A seat according to claim 1, in which the first seat element is constituted by the seat proper and the second seat element is constituted by the seat back.

* * * * *